(12) United States Patent
Onffroy et al.

(10) Patent No.: US 10,394,703 B2
(45) Date of Patent: Aug. 27, 2019

(54) MANAGING CONVERGED IT INFRASTRUCTURE WITH GENERIC OBJECT INSTANCES

(71) Applicant: VCE Company, LLC, Marlborough, MA (US)

(72) Inventors: Joshua P. Onffroy, Upton, MA (US); Rajesh Nandyalam, Whitinsville, MA (US); Michael Holloway, Point Pleasant, NJ (US); Stephen C. Steir, Hopkinton, MA (US)

(73) Assignee: VCE IP Holding Company LLC, Richardson, TX (US)

( * ) Notice: Subject to any disclaimer, the term of this patent is extended or adjusted under 35 U.S.C. 154(b) by 799 days.

(21) Appl. No.: 13/731,337

(22) Filed: Dec. 31, 2012

(65) Prior Publication Data

US 2014/0059196 A1    Feb. 27, 2014

Related U.S. Application Data

(60) Provisional application No. 61/693,221, filed on Aug. 24, 2012.

(51) Int. Cl.
*H04L 12/24* (2006.01)
*G06F 11/36* (2006.01)
(Continued)

(52) U.S. Cl.
CPC ........ *G06F 11/3692* (2013.01); *G06F 9/4411* (2013.01); *G06F 9/54* (2013.01);
(Continued)

(58) Field of Classification Search
CPC .. G06F 21/6218; G06F 21/577; G06F 21/604; G06F 2221/033; G06F 2221/034;
(Continued)

(56) References Cited

U.S. PATENT DOCUMENTS 6,549,943 B1    4/2003  Spring
6,901,346 B2    5/2005  Tracy et al.
(Continued)

FOREIGN PATENT DOCUMENTS

WO    WO 2011128596 A1    10/2011

OTHER PUBLICATIONS

International Search Report, PCT/US2013/056446, dated Nov. 21, 2013.
(Continued)

*Primary Examiner* — Younes Naji
*Assistant Examiner* — Da T Ton
(74) *Attorney, Agent, or Firm* — Womble Bond Dickinson (US) LLP

(57) ABSTRACT

An improved technique for managing an electronic system suitable for providing users with information technology resources, such as compute, storage, and network resources, builds an object model instance of data center components to represent the data center components as a unified entity, which administrators can access as a single-point source for information about the components. In some examples, the object model instance also serves as a single-point for management control of the electronic system. The object model instance is populated with information obtained from a discovery process, where components are queried to report their actual configuration and state, as well as physical and logical relationships among them.

22 Claims, 8 Drawing Sheets

(51) Int. Cl.
*G06F 9/54* (2006.01)
*G06F 11/00* (2006.01)
*G06F 9/4401* (2018.01)
*G06F 11/30* (2006.01)
*H04L 12/26* (2006.01)

(52) U.S. Cl.
CPC ........ *G06F 11/008* (2013.01); *G06F 11/3048* (2013.01); *G06F 11/3672* (2013.01); *G06F 11/3688* (2013.01); *H04L 41/022* (2013.01); *H04L 41/0233* (2013.01); *H04L 41/0856* (2013.01); *G06F 11/3086* (2013.01); *H04L 43/0817* (2013.01)

(58) Field of Classification Search
CPC ...... G06F 3/067; G06F 11/00; G06F 11/0781; G06F 11/08; G06F 11/1076; G06F 11/3466; G06F 2211/1028; G06F 9/5077; H04L 41/0806; H04L 41/50; H04L 41/0813; H04L 41/0816; H04L 41/0803; H04L 41/0869; H04L 41/0873; H04L 41/0893; H04L 41/5054; H04L 41/5077; H04L 67/1097; H04L 29/08549
USPC ..................... 709/220–226; 726/1–5, 23–26; 713/193–194
See application file for complete search history.

(56) References Cited

U.S. PATENT DOCUMENTS

| | | | |
|---|---|---|---|
| 6,944,654 B1* | 9/2005 | Murphy | G06F 11/3034 709/201 |
| 6,996,517 B1 | 2/2006 | Papaefstathiou | |
| 7,096,502 B1 | 8/2006 | Fox et al. | |
| 7,197,489 B1 | 3/2007 | Gauvin et al. | |
| 7,234,093 B2 | 6/2007 | Kadkade | |
| 7,454,487 B1* | 11/2008 | Becher | H04L 41/0233 707/999.2 |
| 7,536,599 B2 | 5/2009 | Paliwal et al. | |
| 7,627,891 B2 | 12/2009 | Williams et al. | |
| 7,689,602 B1* | 3/2010 | Sim-Tang | G06F 11/1448 707/673 |
| 7,757,121 B1 | 7/2010 | Perron et al. | |
| 8,019,849 B1* | 9/2011 | Lopilato | G06F 16/1827 709/223 |
| 8,065,660 B1 | 11/2011 | Tanner et al. | |
| 8,122,261 B2 | 2/2012 | Sakamura et al. | |
| 8,140,899 B2 | 3/2012 | Ren et al. | |
| 8,161,559 B2 | 4/2012 | Bowden et al. | |
| 8,224,775 B2 | 7/2012 | Schwartz et al. | |
| 8,539,589 B2 | 9/2013 | Prafullchandra et al. | |
| 8,627,275 B1 | 1/2014 | Belov et al. | |
| 8,635,594 B1* | 1/2014 | Krishnan | G06F 9/45512 707/609 |
| 8,707,385 B2 | 4/2014 | Jain et al. | |
| 8,800,047 B2 | 8/2014 | Kline et al. | |
| 2004/0225952 A1* | 11/2004 | Brown | G06F 8/20 714/819 |
| 2009/0100178 A1 | 4/2009 | Gonzales et al. | |
| 2009/0249213 A1* | 10/2009 | Murase | H04L 41/12 715/735 |
| 2010/0146004 A1* | 6/2010 | Sim-Tang | G06F 11/1448 707/797 |
| 2011/0004457 A1* | 1/2011 | Haviv | G06F 8/61 703/21 |
| 2013/0110799 A1 | 5/2013 | Hoppe et al. | |
| 2013/0339498 A1 | 12/2013 | Johnson | |

OTHER PUBLICATIONS

The Security Content Automation Protocol (SCAP), Jul. 21, 2010, obtained at http://scap.nist.gov/events/2010/cyberscope/SCAP%20Overview.pdf on Apr. 25, 2013.

Specification for the Extensible Configuration Checklist Description Format (XCCDF) Version 1.2, Mar. 2012, obtained at http://csrc.nist.gov/publications/nistir/ir7275-rev4/nistir-7275r4_updated-march-2012_clean.pdf on Apr. 25, 2013.

Introduction to OVAL—Open Vulnerability and Assessment Language, 2007, obtained at http://nvd.nist.gov/scap/docs/conference%20presentations/workshops/OVAL%20Tutorial%201%20-%20Overview.pdf on Apr. 25, 2013.

International Search Report, PCT/Us2013/056443, dated Mar. 12, 2013.

Mohammed Noraden Alsaleh et al: "SCAP based configuration analytics for comprehensive compliance checking", Configuration Analytics and Automation (SAFECONFIG), 2011 4th Symposium on, IEEE, Oct. 31, 2011 (Oct. 31, 2011), pp. 1-8, XP032079153, DOI: 10.1109/SAFECONFIG.2011.6111674 ISBN: 978-1-4673-0401-6.

Robert A Martin Editor: "Draft Recommendation ITU-T X.xccdf, Extensible Configuration checklist description format;TD 1995r1", ITU-T Draft ; Study Period 2009-2012, International Telecommunication Union, Geneva ; CH, vol. 4/17, Dec. 1, 2011 (Dec. 1, 2011), pp. 1-93, XP017571649, [retrieved on Dec. 12, 2011].

An introduction to the OVAL (trademarked) Language, Version 5.0, (c)2006 The MITRE Corporation, pp. 1-14.

Positive Research Center, Introduction to XCCDF, security benchmark automation, Apr. 11, 2012, pp. 1-5.

Worrell, Bryan, An Introduction to XCCDF, security benchmark automation, (c)2010 The MITRE Corporation, pp. 1-30.

Buttner, Andrew, Security Content Automation Protocol (SCAP) Introduction, Oct. 26, 2009, pp. 1-102.

Schmidt, Charles, Technical Introduction to SCAP, (c)2010 The MITRE Corporation, pp. 1-29.

Case, Fedor, Schoffstall, & Davin, "A Simple Network Management Protocol (SNMP)" May 1990.

Distributed Management Task Force, Inc. and WBEM Solutions, Inc., "CIM Tutorial" 2003.

Cisco Systems, Inc., "CISCO UCS Manager XML API Programmers Guide", Apr. 21, 2011.

English language translation of WO 2011128596, Vicat-Blanc-Primet et al. Oct. 20, 2011.

* cited by examiner

MANAGING CONVERGED IT INFRASTRUCTURE WITH GENERIC OBJECT INSTANCES

This application claims the benefit of provisional application No. 61/693,221, filed Aug. 24, 2012, which is hereby incorporated by reference in its entirety.

BACKGROUND

Data centers perform a diverse range of functions, such as hosting websites, warehousing information, and providing cloud-based computing solutions for remote users. To support such functions, data centers typically include a myriad of equipment, such as racks of computing servers and network switches, data storage arrays, power distribution units, temperature monitoring sensors, location/positioning mechanisms, cables, and fan assemblies, for example.

The various equipment, also known as components, of a data center may be connected in many different ways for management access by data center administrators. For example, the components may be connected to a computer network via a network address or may be accessed directly via a serial interface. Administrators can operate management consoles to connect to the components using browsers or other software tools. Administrators can typically use administrative tools to communicate with components to enquire about their status, to configure the components, and to run diagnostic tests, for example.

The different types of components of a data center typically each have a different software interface. The software interfaces are generally supplied by the component manufacturers and may include component object models that the administrator can traverse and query to obtain component-specific information.

SUMMARY

Unfortunately, the variety of component types found in data centers places a burden on administrators to learn to operate the various software interfaces of the components. Responsibilities of data center administrators can thus become complex.

The task of administrators can be further complicated when problems are suspected. With the conventional arrangement, administrators must typically examine components individually to ascertain whether they are functioning properly. Chasing down the root cause of a suspected fault can sometimes require administrators to connect to many components using multiple software interfaces, consuming a great deal of time. The conventional approach thus not only demands substantial expertise from administrators, but also can cause diagnoses of suspected problems to be delayed.

In addition, the conventional approach places many burdens on administrators with regard to updates and maintenance. Typically, administrators must update components as manufacturers release new software versions one at a time. Also, each time a manufacturer changes a component model or introduces a new component type, multiple tools and processes must be reworked and revised to accommodate the changes.

In contrast with the prior approach, an improved technique builds an object model instance of data center components to represent the data center components as a unified entity, which administrators can access as a single-point source of information about the components. The object model instance is populated with information obtained from a discovery process, where components are queried to report their actual configuration and state.

In some examples, major categories of components, such as storage, compute, and network, are represented in the object model instance as logical sub-object instances that form "silos" of component types. Information about individual components of each category may then be populated within the object model instance under the respective silos.

Administrators can thus access information about components through the object model instance and without the need to access component software interfaces individually. Also, in some examples, administrators can obtain diagnostic information about individual components from the object model instance. In further examples, diagnostic information about individual components is combined to produce an overall system health metric, which administrators may access to observe an overall system health assessment. In further examples, the system object instance acts not only as a source of information about components of the electronic system, but also as a management control context for managing updates and/or supporting configuration changes in a more unified and convenient manner than can be achieved by prior techniques.

Certain embodiments are directed to a method of managing an electronic system for providing information technology (IT) resources to users. The method includes communicating over a network with physical components of the electronic system to discover configuration information from the physical components. The physical components include storage components, compute components, and network components. The method further includes generating a system object instance according to an object model of the electronic system. The system object instance represents the electronic system as a unified entity and includes (i) a first set of sub-object instances of the system object instance representing respective logical categories of the physical components and (ii) a second set of sub-object instances of the system object instance representing respective physical components of the electronic system and providing access to the configuration information discovered from the physical components over the network. The first set of sub-object instances includes a logical storage instance to represent the data storage components of the electronic system as a unified entity, a logical compute instance to represent the compute components of the electronic system as a unified entity, and a logical network instance to represent the network components of the electronic system as a unified entity.

Other embodiments are directed to computerized apparatus and computer program products. Some embodiments involve activity that is performed at a single location, while other embodiments involve activity that is distributed over a computerized environment (e.g., over a network).

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same parts throughout the different views. In the accompanying drawings.

DETAILED DESCRIPTION OF THE INVENTION

Embodiments of the invention will now be described. It is understood that such embodiments are provided by way of example to illustrate various features and principles of the invention, and that the invention hereof is broader than the specific example embodiments disclosed.

An improved technique for managing data center components builds an object model instance of the components to represent the components as a unified entity, which administrators can access as a single-point source of information about the components. As will be described, examples of the improved technique also provide a unified control context for managing, controlling, and/or maintaining data center components.

Figure 1:
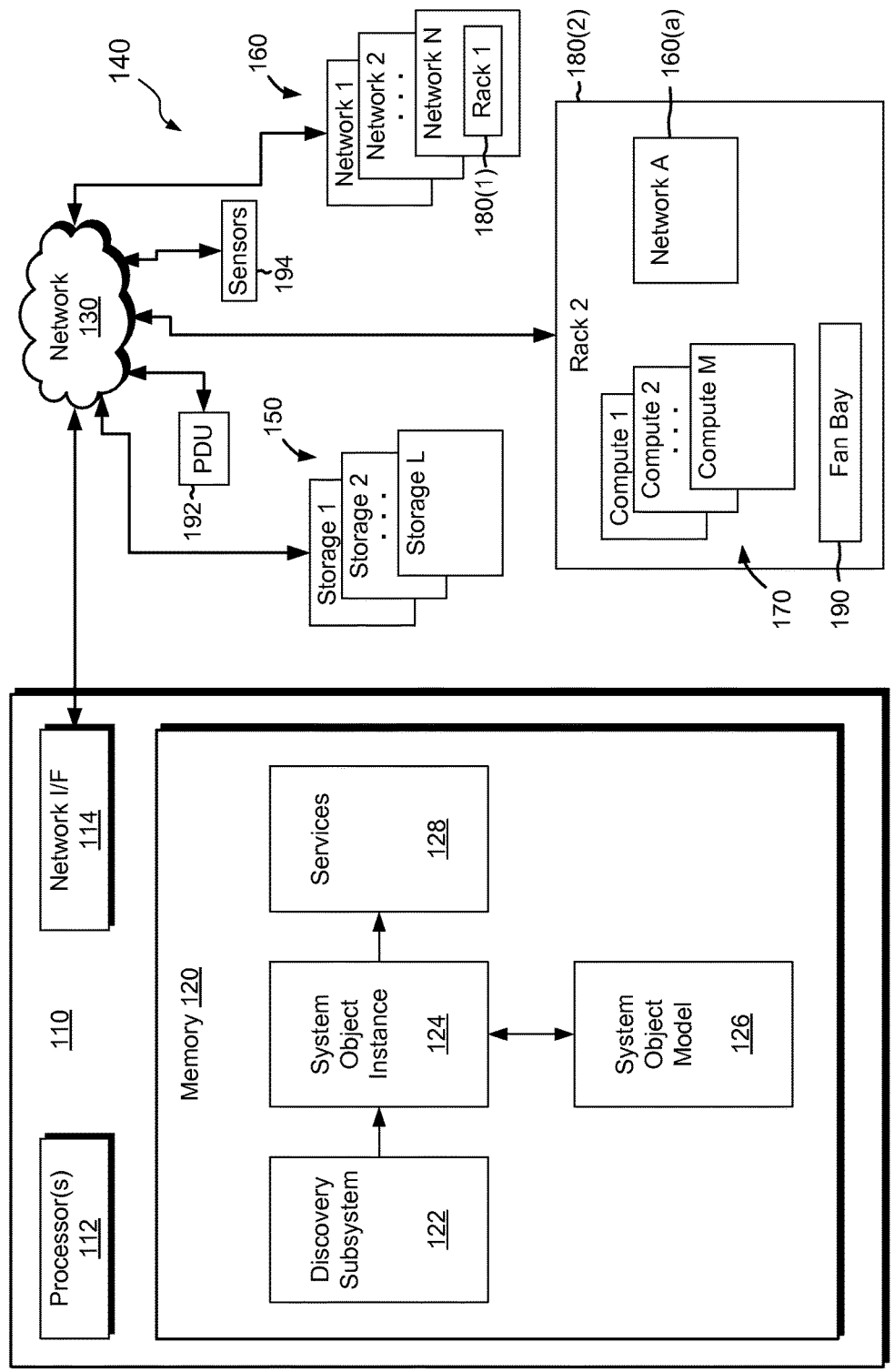
FIG. 1 is a block diagram of an example data center, wherein a computerized apparatus obtains discovery information from components of an electronic system to build an object model instance of the electronic system.

FIG. 1 shows an example environment in which embodiments of the improved technique hereof can be practiced. The environment includes a computerized apparatus 110, a network 130, and an electronic system 140.

The computerized apparatus 110 includes a set of processors 112 (i.e., one or more processing chips and/or assemblies), a network interface 114, and memory 120. The memory 120 includes both volatile memory (e.g., RAM) and non-volatile memory (e.g., one or more disk drives, solid state drives, and the like). The memory 120 stores various software constructs (i.e., sets of instructions and/or data), including a discovery subsystem 122, a system object instance 124, a system object model 126, and services 128. The memory 120 typically stores other software constructs as well, e.g., an operating system, programs, libraries, and so forth; however, these are omitted from the figure for the sake of clarity. The set of processors 112 is configured to execute instructions of the software constructs in the memory 120 to carry out the various processes as described herein.

In an example, the network 130 is a local area network (LAN). Alternatively, the network 130 is arranged as a wide area network (WAN) or some other type of network. The network 130 can be a hard-wired network, a wireless network, or a combination of hard-wired and wireless technologies.

The electronic system 140 includes a variety of components, including storage components 150 (Storage 1 through Storage L), network components 160 (Network 1 through Network N and Network A), and compute components 170 (Compute 1 through Compute M). One of the network components 160 (Network N) includes a rack 180(1), i.e., an enclosure assembly having one or more backplanes for receiving circuit board assemblies. In an example, the rack 180(1) includes network blade switches (not shown). The electronic system 140 also includes a rack 180(2). The rack 180(2) includes the compute components 170 (e.g., as server blades), the network component 160(a) (e.g., as a blade switch), and a fan bay 190. The electronic system 140 may further include one or more PDUs (power distribution units) 192 and/or one or more sensors 194, such as temperature sensors, humidity sensors, and so on. These may be included anywhere in the electronic system 140. For example, sensors 194 may be included in the open to measure the environment of a data center (as shown). Sensors 194 may also be included within particular assemblies (e.g., racks, storage arrays, circuit boards, etc.), on particular chips (e.g., junction temperature sensors), and so forth.

In an example, the electronic system 140 is provided in the form of a converged infrastructure system, which includes a predetermined configuration of components. An example of such a converged infrastructure system is the Vblock™ family of systems available from VCE Company of Richardson, Tex.

In operation, the discovery subsystem 122 performs a discovery operation on the electronic system 140 to obtain configuration information from the components of the electronic system 140, including the storage components 150, the network components 160, the compute components 170, the racks 180(1-2), the fan bay 190, the PDUs 192, the sensors 194, and any other components of the electronic system 140 reachable over the network 130. In an example, the discovery subsystem 122 collects information about both individual components and information about relationships among the components. For instance, the discovery subsystem 122 identifies not only the characteristics of the rack 180(1), but also the fact that the rack 180(1) is positioned within Network N. Similarly, the discovery subsystem 122 discovers not only the particular characteristics of the Compute 1 blade, but also the fact that it is located within the rack 180(2) along with other compute blades and equipment.

The configuration information for any component can include a myriad of diverse information about the component. Typically, the configuration information for a component includes some or all of the information that the component's software interface normally supplies, as provided by the respective manufacturer. In some examples, the configuration information includes additional details about the component, such as its physical location relative to other components, a parent component (e.g., a rack in which it is installed), and any logical groups to which it belongs, e.g., a RAID Groups, LUNs (logical storage units), computing clusters, etc. In some examples, the additional details also include computed summary information or metrics that describe the component, which may be obtained from multiple separate pieces of information read back from the component and/or related components, which describe, for example, the utilization of the component, component health, i.e., whether the component appears to be functioning properly, and/or other information. In further examples, the configuration information includes user-specified metadata previously stored on or in connection with particular components.

Once the discovery subsystem 122 has collected and/or computed configuration information from the components of the electronic system 140, the discovery subsystem 122 applies the configuration information to generate a system object instance 124, which represents the electronic system 140 as a unified entity. The system object instance 124 is created as a specific instance of a system object model 126 and reflects the actual configuration information discovered from the electronic system 140. The system object model 126 is generic to a wide range of possible configurations and component types found in electronic systems, whereas the system object instance 124 is specific to the actual configuration and component types of the electronic system 140.

In one example, the system object model is a class definition (e.g., a class, set of sub-classes, methods, properties, etc.) implemented in an object-oriented programming language, such as Java or C++, for example. The system object instance 124 is then a particular instantiation of the software class and its sub-classes, populated with configuration information from discovery. In another example, the system object model 126 is implemented as a database schema, such as a schema for a PostgreSQL database, and the system object instance 124 is a particular collection of tables and relationships build in accordance with the schema and reflecting the discovered configuration information. The database implementation may be preferred in some examples because it provides the benefit of persistence. The database implementation allows the system object instance 124 to be stored in non-volatile memory and thus to avoid frequently re-running the entire discovery operation, which can take up to several hours for complex electronic systems.

In an example, generating the system object instance 124 is conducted by instantiating a class for the system object and instantiating each of a first set of sub-object classes subordinate to the system object class. A resulting first set of sub-object instances each represent a different logical category, or "silo," of components, such as "storage," "compute," and "network," for example. Any number of the first set of sub-object instances can be provided, including a greater or lesser number covering various types of components. For example, a "connectivity" object instance can be instantiated from the system object model 126 to provide a silo for cables and other connection components. Similarly, a "Graphics" object instance can be instantiated from the system object model 126 to provide a silo for graphics processing units (GPUs) and other video streaming components. It is emphasized that the silos represented by the first set of sub-object instances are logical constructs, as no single component is identified by "storage," "compute," and so forth. Rather, such silos form container structures for aggregating underlying physical components of respective types and, in some cases, logical components or logical groups of physical components (e.g., RAID groups, LUNs, clusters, etc.). In some examples, the silos themselves contain aggregate information about underlying components, such as utilization, health, etc., which cannot be obtained directly from any single physical component.

Generating the system object instance 124 further includes instantiating each of a second set of sub-object classes from the system object model 126, to represent underlying physical components of the electronic system 140 with a second set of sub-object instances. For example, sub-classes of the system object model 126 corresponding to particular physical components (e.g., disk arrays, server blades, racks, etc.) are instantiated to generate object instances that provide software models of the components. In some examples, these object instances are similar to the software interfaces provided by the component manufactures, but may include additional information and functionality. Also, unlike the software interfaces available from the manufacturers, these second set of sub-object instances fit within and are integrated with the overall system object instance 124. It is understood that the second set of sub-object instances refer to respective physical components and can thus be regarded as software implementations of physical models, or "physical" instances, which differ from the logical instances in the first set of sub-object instances.

In some examples, the software models in the second set of sub-object instances are generic models that represent respective physical component types but are not particular to specific vendor makes or models. For example, a software model for a component type (such as server blade) is constructed generically, so as to be effective in representing a range of different vendor makes and models of components of that type. The sub-object instance for the component includes a number of attribute properties, which are set based on the configuration data returned (during discovery) for the particular component. Thus, the sub-object instance for a component is generated from a generic object class but is customized with particular attribute values such that the resulting software model is specific to the particular component.

Preferably, the system object model 126 makes liberal use of such generic models for representing physical components of compute, network, and storage, as well as connectively components, racks, fan bays, fans, batteries, and essentially any components of the electronic system 140. However, the extensive use of generic models does not preclude the use of vendor or model-specific models where doing so would be sensible or beneficial, such as where a component has only a sole source or where a component is particularly idiosyncratic, such that it does not readily lend itself to a generic model.

The system object instance 124 can include logical and physical object instances at various levels. For example, it is possible for an object instance representing a storage array (physical), which resides under the "storage" silo (logical) to include below it in the object instance hierarchy logical object instances, such as LUNs, VSANs (virtual storage area networks), and RAID groups. Further, any number of storage arrays, or portions thereof, can be grouped in one or more resource pools, which can be represented under the storage silo of the system object instance 124 as respective logical object instances. Also, it is possible for an object instance representing a compute rack (physical), which resides under the "compute" silo (logical) to include logical object instances such as virtual compute blades. Further, it is possible for an object instance representing a network rack (physical), which resides under the "network" silo (logical) to include logical object instances such as VNICs (virtual network interface cards) and VLANS (virtual local area networks).

Where the electronic system 140, or a portion thereof, includes a virtualization platform (e.g., for implementing cloud computing solutions), many logical structures can be composed and decomposed, essentially on the fly, for servicing users connecting to the electronic system 140, e.g., over the Internet. Virtual machines can be created, used, and destroyed, with the discovery subsystem 122 tracking the activity and refreshing the system object instance 124 to reflect changes essentially in real time.

Figure 2:
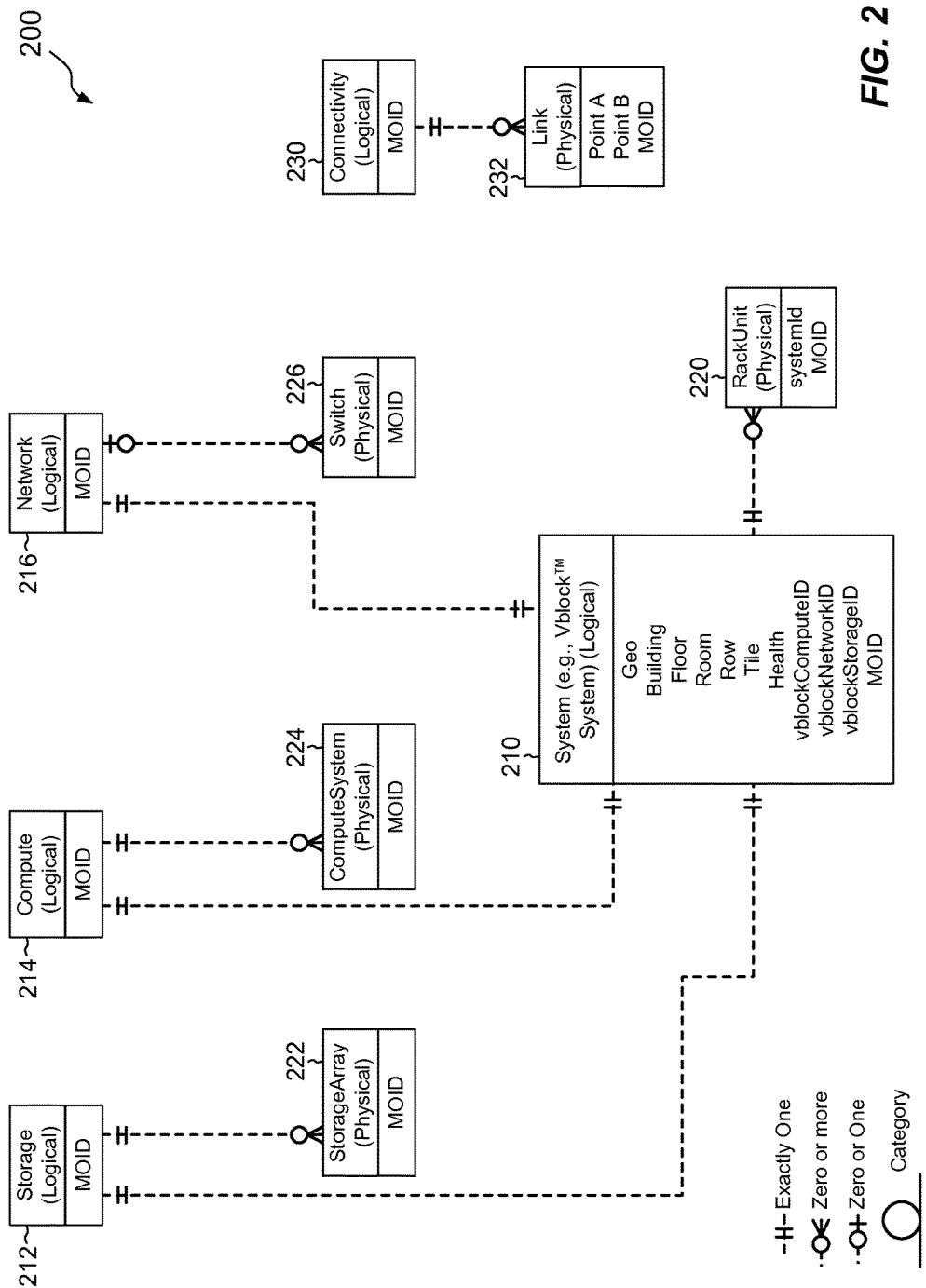
FIG. 2 is an entity-relationship diagram showing an example high-level view of the object model instance of the electronic system of FIG. 1.

The services 128 provide various ways of applying the system object instance 124 for the benefit of administrators and other users. Examples of the services 128 include inventory services (e.g., traversing the system object instance 124 to list the contents of the electronic system 140), query services (e.g., receiving and responding to requests for specific information from the system object instance 124), and reporting aggregate metrics, such as the overall health of the electronic system 140. These services 128 can also encompass management controls, such as self-healing operations (autonomous reconfiguration), firmware remediation, and infrastructure-level resource balancing. FIGS. 2-6 show example additional details of the system object model 126 in the form of entity-relationship (E-R) diagrams. FIG. 2 shows a top-level object structure 200 and includes a legend (lower left) that indicates the meanings of the different symbols used these figures. Various relationships are shown with dashed lines to indicate that the relationships can vary between different system object instances and that the relationships may be missing in certain arrangements.

As shown in FIG. 2, a System object 210 represents the electronic system 140 (e.g., the components of a Vblock™ system) as a single entity. This object 210 (along with its child objects) is what is instantiated to generate the system object instance. A first set of sub-objects (silos) are shown in one-to-one relationships with the System object 210. These sub-objects may be provided as children of the System object 210 and include a Storage object 212, a Compute object 214, and a Network object 216. The objects 212, 214, and 216 are logical objects, as they do not themselves directly represent any individual physical hardware components but rather serve as aggregating objects, which include other objects that directly represent hardware. For example, the Storage object 212 may include instances of a StorageArray object 222, which provides a software model for a physical storage array, such as an EMC Symmetrix or VNX storage array. As indicated by the E-R notation, the Storage object 212 can reference zero or more StorageArray instances instantiated from the StorageArray object 222, i.e., the object model supports any number of storage arrays. Similar relationships are shown for the Compute object 214, which can include any number of instances of a physical ComputeSystem object 224, and for the Network object 216, which can include any number of instances of a physical Switch object 226.

In the example shown, the System object 210 can also include any number of "RackUnit" objects 220. It is noted that RackUnit objects do not necessarily belong to any particular silo. Objects for PSUs 192 and sensors 194 (not shown) may similarly be provided outside the scope of any silo. In an alternative arrangement, another silo object is provided for "Racks," which includes any number of physical RackUnit objects 220 as sub-objects.

In an example, the objects shown in FIG. 2 are part of a base model or super class (not shown), from which the objects of FIG. 2 inherit various common properties and/or methods. The use of a base class avoids duplication of code and provides a construct for associating objects that do not have direct constrained relationships. For example, a Connectivity object 230 is provided without any identified parent. Rather, the Connectivity 230 object is a member of the base class and thus shares a common software structure with the other objects shown. In this particular example, the Connectivity object 230 is configurable to have a number of different parent objects, such as the Switch object 226, the Compute System object 224, or a number of other objects. In the example shown, the Connectivity object 230 is a logical object, which can include any number of physical Link objects 232. Link objects 232 refer to cables.

The objects shown in FIG. 2 can each have any number of methods and/or properties. The properties include attribute properties, whose values are assigned to instances when the system object instance 124 is generated. Each object has an attribute for a model identifier, or "MOID," which is assigned a unique value, such as a globally unique ID (GUID). Although few examples of object attributes are shown in FIG. 2, it is understood that objects typically have hundreds or more attributes. For generic objects representing hardware (e.g., racks, server blades, disks, etc.), the attributes serve to tailor the respective object instances instantiated from those objects to the particular characteristics of the makes or models of the underlying hardware that the object instances represent.

As indicated previously, attributes can specify health, performance, and relationships to other components (e.g., parent objects, containment within racks, etc.). Attributes can also store physical location information, such as GPS coordinates, building address where installed, and location within a data center. In some examples, attributes specify other characteristics generated by the discovery subsystem 122 but not provided directly from the component during discovery. In some examples, attributes store logical information, such as membership in RAID groups, LUNs, or computing clusters, for example.

Figure 3:
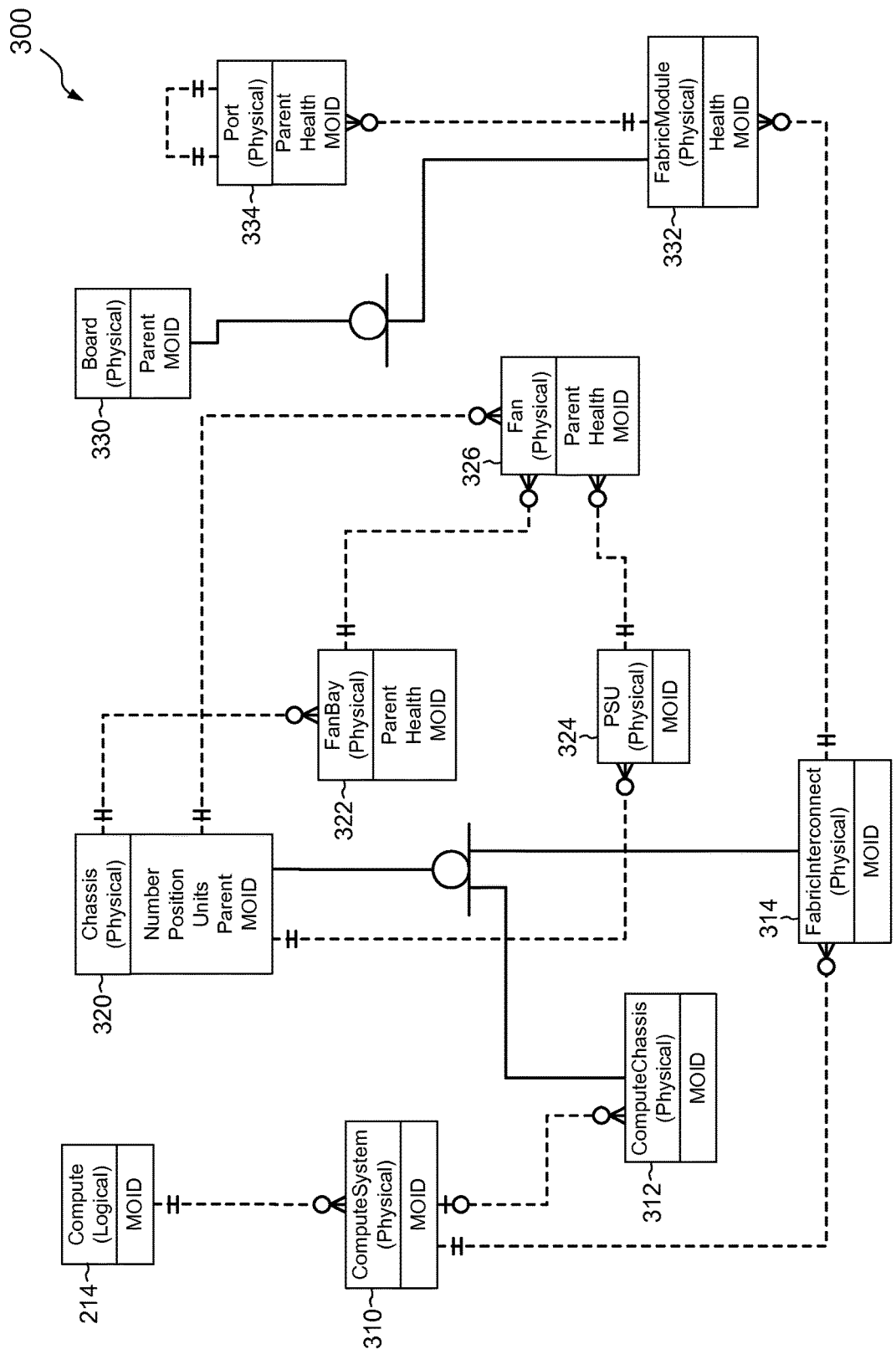
FIG. 3 is an entity-relationship diagram showing an example high-level view of a logical compute object instance of the electronic system of FIG. 1.

FIG. 3 shows an example arrangement 300 of compute objects. Here, the Compute object 214 is seen to include any number of ComputeSystem (physical) objects 310. Each ComputeSystem object 310 can include any number of ComputeChassis objects 312, and any number of FabricInterconnect objects 314. Each FabricInterconnect object 314 can include any number of FabricModule objects 332, which can include any number of Port objects 334. The FabricModule objects 332 are a category of Board objects 330. Also, the ComputeChassis objects 312 and FabricInterconnect objects 314 are categories of a Chassis Object 320. The Chassis object 320 can include any number of FanBay objects 322 and any number of Fan objects 326. Also, the FanBay object 322 can include any number of Fan objects 326. The Chassis object 320 also includes any number of PSU (power supply unit) objects 324, which in turn may include any number of Fan objects 326.

The arrangement of objects in FIG. 3 displays the flexibility of the system object model 126 in representing a variety of system configurations. For example, the variable arrangement of FanBay objects 322 and Fan objects 326 reflects the fact that some chassis include individual fans whereas others include fan bays having multiple fans. The arrangement of FIG. 3 also shows that some of the objects of the object model 126 are reusable in different contexts. For example, the same Fan object 326 may be used to represent a fan in a fan bay of a chassis, a fan of a chassis without reference to any fan bay, and the fan of a power supply unit. In any particular system object instance, these objects can be instantiated in a manner consistent with the particular configuration, with the object instances forming building blocks that can be used as needed in different contexts.

Figure 4:
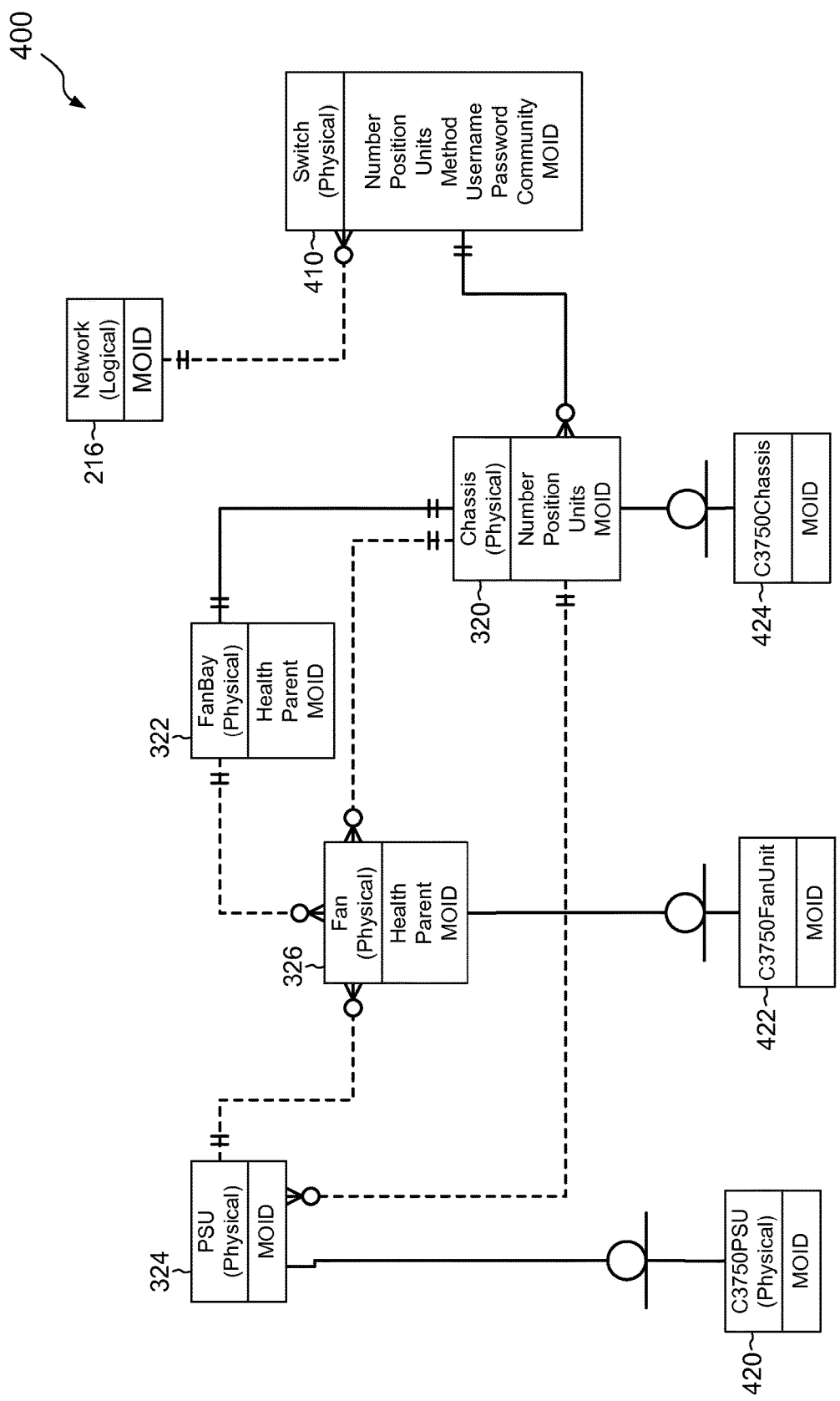
FIG. 4 is an entity-relationship diagram showing an example high-level view of a logical network object instance of the electronic system of FIG. 1.

FIG. 4 shows an example arrangement 400 of network objects. The Network object 216 (from FIG. 2) is seen to include any number of switch objects 410. The Switch object 410 includes any number of Chassis objects 320 (see also FIG. 3). One particular category of the Chassis object 320 is the C3750Chassis object 424. As in the example of FIG. 3, the Chassis object 320 includes any number of FanBay objects 322 as well as any number of Fan objects 326. In some arrangements, each FanBay object 322 includes any number of Fan objects 326. Also as shown in FIG. 3, the Chassis object 320 can include any number of PSU objects 324, each of which in turn can include any number of Fan objects 326. A category of the PSU object 324 is the C3750PSU object 420. A category of the Fan object 326 is the C3750FanUnit object 422. It is seen from FIG. 4 that the same objects (e.g., 320, 322, 324, and 326) that form building blocks for one silo can also be used as building blocks in another silo. Such objects forming building blocks are thus not constrained to any silo and can be used throughout the object model.

Figure 5:
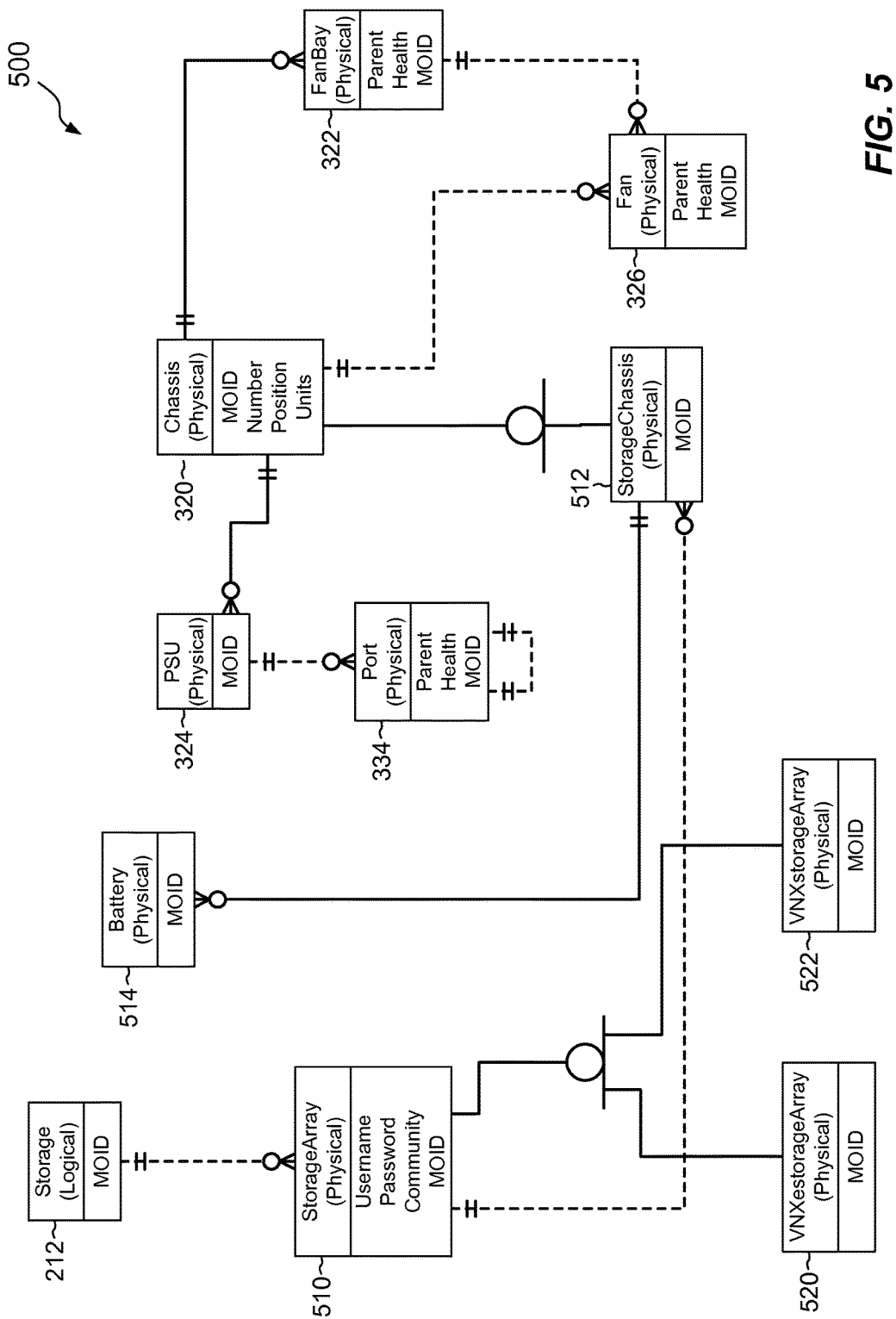
FIG. 5 is an entity-relationship diagram showing an example high-level view of a logical storage object instance of the electronic system of FIG. 1.

FIG. 5 shows an example arrangement 500 of storage objects. Here, the Storage object 212 (from FIG. 2) is seen to include any number of StorageArray objects 510. Categories of the StorageArray object 510 include a VNXestorageArray object 520 and a VNXstorageArray object 522. Each StorageArray object 510 can include any number of StorageChassis objects 512, each of which can include any number of Battery objects 514. Here, the Chassis object 320 is shown as a category of the StorageChassis object 512. As in FIGS. 3 and 4, the Chassis object 320 can include any number of FanBay objects 322 and any number of Fan objects 326. Each FanBay object 322 can include any number of Fan objects 326. The Chassis object 320 can include any number of PSU objects 324. Unlike in FIGS. 3 and 4, the PSU object 324 of FIG. 5 can include any number of ports 334, thus reflecting the fact that power supply units of storage chassis can include multiple ports. The arrangement of FIG. 5 further underscores the reusable nature of objects as building blocks, even in different system contexts, where customization of the generic building blocks is achieved by arranging object instances and populating their attributes based on discovery.

Figure 6:
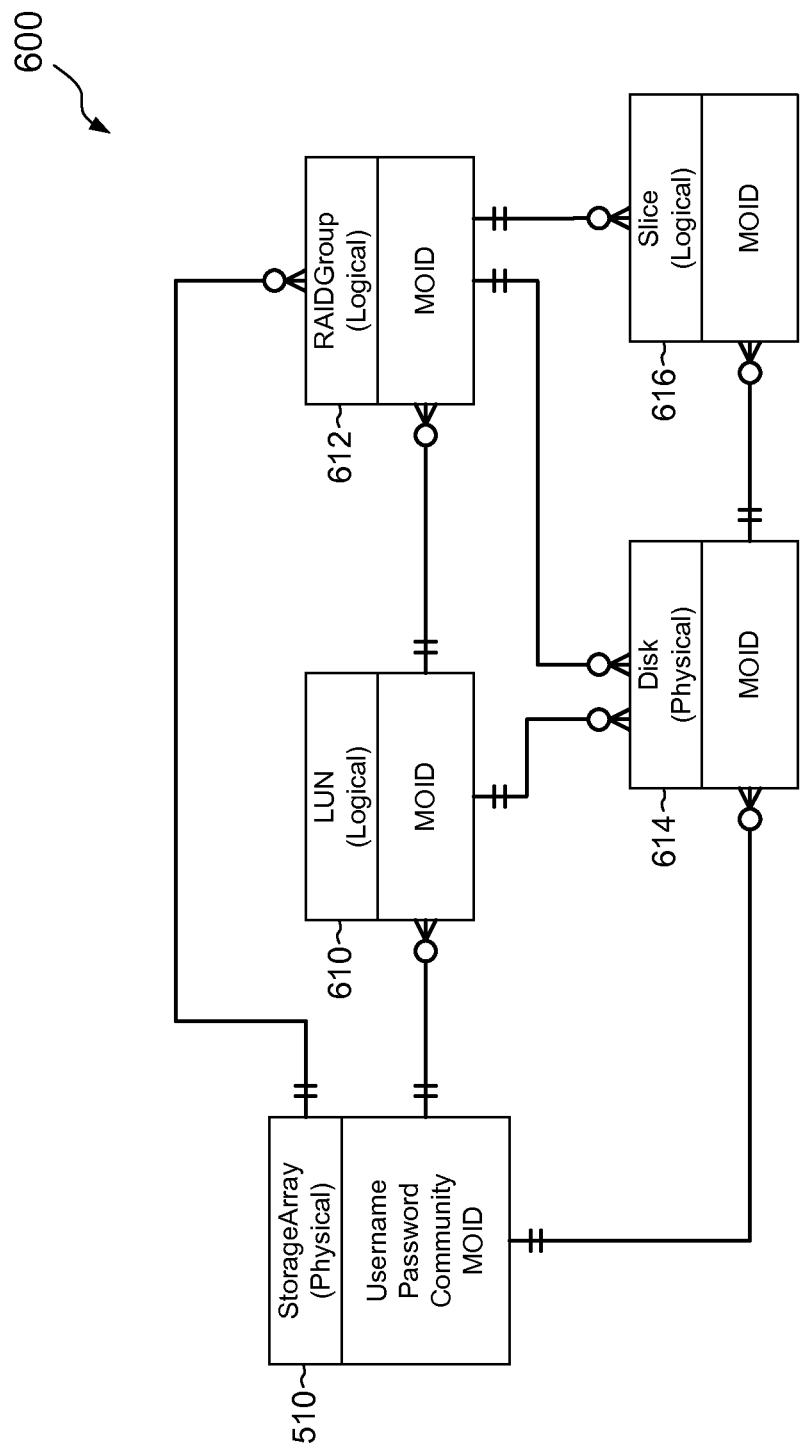
FIG. 6 is an entity-relationship diagram showing an example relationship among a physical storage instance and logical storage instances of the electronic system of FIG. 1.

FIG. 6 shows an example arrangement 600 of physical and logical storage objects. Here, the StorageArray object 510 can reference any number of LUN objects 610, which in turn can each reference any number of RAIDGroup objects 612. Also, the StorageArray object 510 can directly reference any number of Disk objects 614 and any number of RAIDGroup objects 612. Each Disk object 614 can reference any number of Slice objects 616. Also, each LUN object 610 and each RAIDGroup object 612 can reference any number of Slice objects 616. The arrangement 600 thus shows how physical and logical objects can be used together as building blocks in the system object model 126. Similar arrangements can be made for compute objects (e.g., via logical compute blades) and for network objects (e.g., via VNICs and VLANs).

Using the system object model 122, as shown by way of example in FIGS. 2-6, a particular system object instance 124 can be generated and populated with actual discovered configuration information obtained from the components of the electronic system 140. Owing to the generic nature of the system object model 122, different system object instances 124 can be generated to reflect different configurations of the electronic system 140, and indeed to reflect different electronic systems. In some arrangements, a single computerized apparatus 110 can connect, e.g., over the network 130, with multiple electronic systems (e.g., multiple Vblock™ systems), where each electronic system is represented with a respective system object instance. Each such system object instance may have a different MOID and a different name attribute. In some examples, higher level objects are provided, such as a DataCenter object, which includes multiple System objects.

Figure 7:
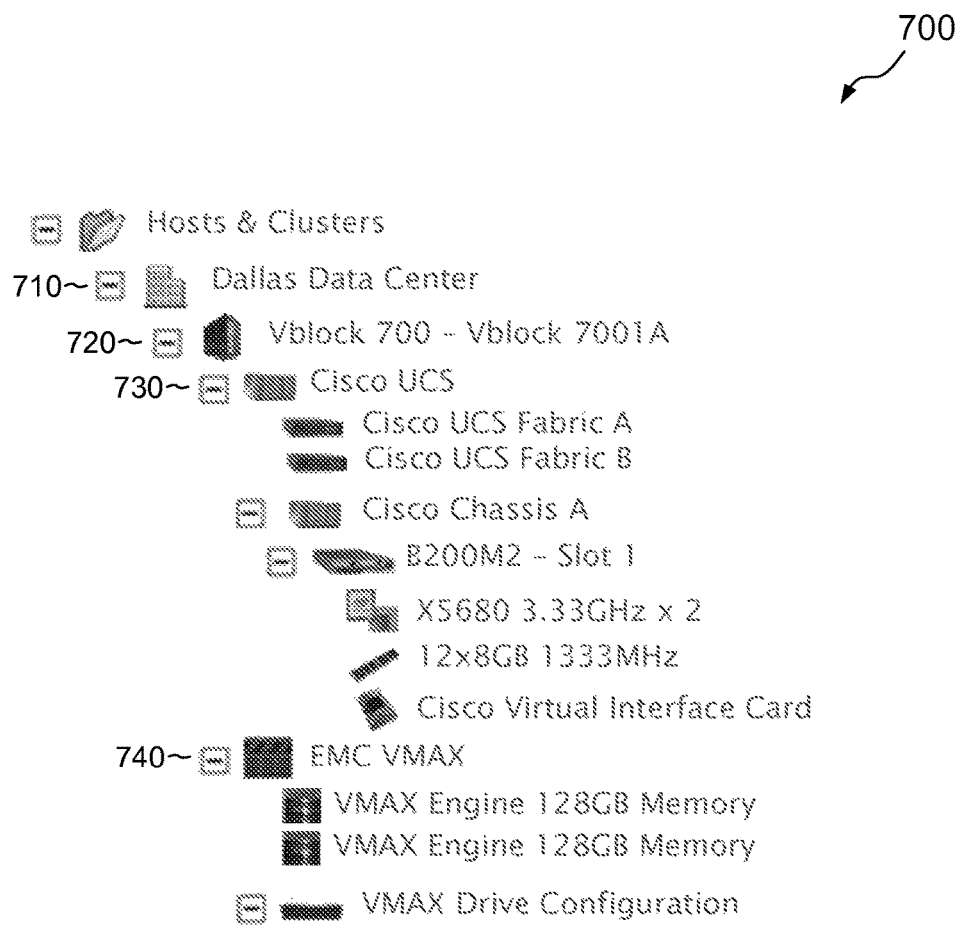
FIG. 7 is a partial screen-shot showing an example hierarchical GUI display of information obtained from the object model instance of the electronic system of FIG. 1.

FIG. 7 shows an example portion of a screen shot 700 of a system management tool. The particular tool illustrated is a version of the vCenter management tool available from VMware of Palo Alto, Calif., which has been adapted to access the system object instance 124 (or multiple such instances). In an example, the modified management tool runs on the computerized apparatus 110. Alternatively, a server portion of the management tool runs on the computerized apparatus 110 and one or more respective client versions run on user computing devices (e.g., PCs, laptops, tablet computers, etc.), which connect to the computerized apparatus 110 over the network 130 (or, for example, over the Internet).

In an example, the management tool accesses the services 128 to perform various functions, such as inventory functions, query functions, and functions to compute system health status. The screenshot 700 displays an entry 710 identifying a data center (Dallas Data Center). The data center entry 710 shows various members, as indicated in the hierarchical display, including an entry 720 for a Vblock™ 700-Vblock™ 7001A, i.e., a converged infrastructure system represented with a system object instance 124. The entry 720 includes an entry 730 (Cisco UCS), which designates a compute assembly. Subcomponents of the compute assembly are shown (i.e., Cisco UCS Fabric A, Cisco UCS Fabric B, and so forth). Another entry 740 appears under the entry 720 for the Vblock™ 700-Vblock™ 7001A, to represent a storage component (EMC VMAX). Various sub-components of the EMC VMAX are shown.

In an example, the screen shot 700 is generated by accessing the system object instance 124 that represents the Vblock™ system identified in the entry 720 and enumerating through the object instance to identify the components of the Vblock™ system and their relationships to one another. Attributes of the respective object instances indicating model names and numbers are read and displayed on the screenshot 700, in a hierarchical structure that minors the structure of the system object instance 124.

In addition to showing an inventory of components of an electronic system, the management tool also provides a means by which others of the services 128 can be invoked. For example, users can query details about specific objects by clicking on the respective entries or their icons, causing component-specific information about the clicked entries to be displayed in another panel of the screen (not shown). When an entry is clicked, a query is generated to the system object instance 124, e.g., via a REST (representational state transfer) request. A REST response is returned, which provides the requested information.

Also, users can right-click on displayed entries to bring up a menu of selections. In an example, available options include computing a system health metric, performing upgrades, and running compliance verifications tasks.

Figure 8:
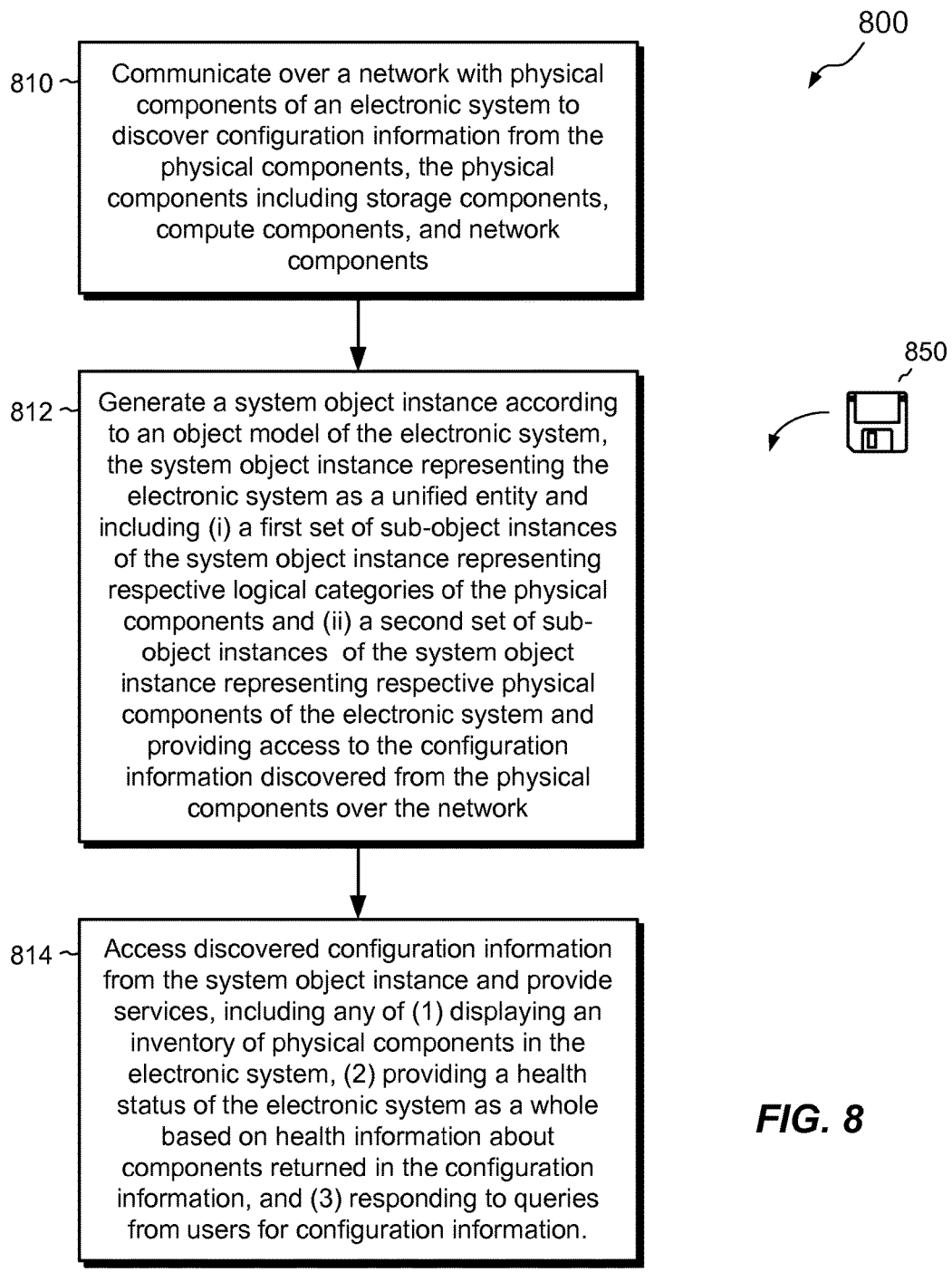
FIG. 8 is a flowchart showing an example process for managing the electronic system of FIG. 1.

FIG. 8 shows a process 800 for managing an electronic system that is suitable for providing information technology (IT) resources to users. The process 800 may be carried out in connection with the computerized apparatus 110 and is typically performed by the software constructs, described in connection with FIG. 1, which reside in the memory 120 of the computerized apparatus 110 and are run by the set of processors 112. The various acts of the process 800 may be ordered in any suitable way. Accordingly, embodiments may be constructed in which acts are performed in orders different from those illustrated, which may include performing some acts simultaneously, even though the acts are shown as sequential in the illustrated embodiments.

At step 810, a computerized apparatus communicates over a network with physical components of an electronic system to discover configuration information from the physical components. The physical components include storage components, compute components, and network components. For example, the discovery subsystem 122 of the computerized apparatus 110 communicates over the network 130 with components of the electronic system 140 to obtain discovery information regarding the components and their relationships to one another.

At step 812, the computerized apparatus generates a system object instance according to an object model of the electronic system. The system object instance represents the electronic system as a unified entity and includes (i) a first set of sub-object instances of the system object instance representing respective logical categories of the physical components and (ii) a second set of sub-object instances of the system object instance representing respective physical components of the electronic system and providing access to the configuration information discovered from the physical components over the network. For example, the discovery subsystem 122 generates the system object instance 124 based on the system object model 126 and represents the system object instance 124 as a unified entity, e.g., an instance of the System object 210. The instance of the System object 210 includes logical sub-object instances for silos, e.g., instances of the Storage object 212, the Compute object 214, and the Network object 216. The instance of the System object 210 also includes representations of physical components, such as instances of the StorageArray object 222, the ComputeSystem object 224, and the Switch object 226, for example.

At step 814, the computerized apparatus accesses discovered configuration information from the system object instance and provides services, including any of (1) displaying an inventory of physical components in the electronic system, (2) providing a health status of the electronic system as a whole based on health information about components returned in the configuration information, and (3) responding to queries from users for configuration information. For example, administrators or other users can apply a tool, such as the adapted vCenter tool described in connection with FIG. 7, access the services 128 to view the contents of a Vblock™ system, generate a system health metric, query the system object instance 124 for configuration information about particular components, or invoke management controls. More generally, it is understood that administrators and other users can access the services 128 to obtain dynamic responses outlining a wide range of controls and capabilities associated with the system object instance.

An improved technique has been described for managing an electronic system that provides IT resources to users. The improved technique builds an object model instance of components to represent the components as a unified entity, which administrators can access as a single-point source of information about and management controls for the components. Administrators can use the improved technique to access information about components through the object model instance and without the need to access component software interfaces individually. The burden on administrators to become expert in diverse software interfaces of components is thus reduced, as is the time required to explore components to diagnose suspected faults.

As shown and described, the system object instance 124 derived from the system object model 126 is capable of providing a single, unified, and holistic access point to a wide range of diverse components, including compute components, storage components, network components, racks, PDUs, and environmental sensors, such as thermal sensors, moisture sensors, and power sensors, for example. The scope of a system object instance 124 can vary from a relatively small grouping of diverse components to an entire data center, or even multiple data centers.

Further, system object instances 124 act as enabling technology for promoting administration and control at a level never before achieved. For example, administrators can query a system object instance 124 to obtain a single metric designating the overall health state of their data center, an overall (or remaining) capacity of their data center, and an overall compliance state of their data center, such as whether software and firmware are up to date or at an acceptable level, for example. Relationships among components, like storage and network components, traditionally regarded as occupying wholly different domains, can be detected and acted upon, automatically or with minimal administrative input. For example, using system object instances 124, the detection that a network switch has a certain firmware upgrade can result in the storage arrays being operated in an enhanced mode, which takes advantage of improved network operation. The higher level of integration afforded by system object instances 124 thus enables a level of coordination not previously possible.

Also, system object instances 124 have the ability to be agile and extensible. New components can be added to a data center, with the new components discovered (by the discovery subsystem 122) and represented in a resulting system object instance 124. As discovery also detects physical relationships and connections among components, which may be represented as building blocks, system object instances 124 can reflect new connections and physical arrangements. Components can be moved, removed, or replaced with different components. As new component types are developed, the new component types can be represented with generic objects, whose attributes are tailored to the particulars of the component types, or they can be represented by new objects, which can be created, instantiated, and used alongside existing ones in system object instances 124.

The system object instances 124 also promote backward compatibility of software. Any software applications or processes that access a system object instance 124 and rely on a particular configuration of data center components can continue to run, with little or no changes, as new components are added to a data center. For example, a new rack can be added to the data center housing new compute blades, but software using an existing rack need not change, as the object building blocks used to represent the earlier arrangement may simply form a subset of the updated arrangement, which continues to operate as before.

As used throughout this document, the words "comprising," "including," and "having" are intended to set forth certain items, steps, elements, or aspects of something in an open-ended fashion. Although certain embodiments are disclosed herein, it is understood that these are provided by way of example only and the invention is not limited to these particular embodiments.

Having described certain embodiments, numerous alternative embodiments or variations can be made. For example, although the computerized apparatus 110 is shown as a single element, the computerized apparatus 110 can alternatively be implemented as a distributed apparatus, with different elements provided at different locations. In some examples, the computerized apparatus 110 can itself reside on one or more components of the electronic system 140, and can be provided in the form of a physical machine or a virtual machine.

Also, the electronic system 140 has been described as being part of a data center. However, this is merely an example, as the techniques disclosed herein can be performed in any computing environment.

Also, while the electronic system 140 may have a particular geographical location, this is not required. Alternatively, the different components that make up the electronic system 140 may be distributed among different geographic locations. The electronic system 140 may thus be regarded as having no particular physical boundaries.

Also, while the system object instance 124 has been described primarily as a source of information about components and their configurations, the system object instance 124 can also be used to provision and control components. For example, methods of various object instances can be employed to create logical constructs, such as virtual machines, LUNs, and so forth, and to establish settings on components to affect their operation.

Further, although features are shown and described with reference to particular embodiments hereof, such features may be included in any of the disclosed embodiments and their variants. Thus, it is understood that features disclosed in connection with any embodiment can be included as variants of any other embodiment, whether such inclusion is made explicit herein or not.

Further still, the improvement or portions thereof may be embodied as a non-transient computer-readable storage medium, such as a magnetic disk, magnetic tape, compact disk, DVD, optical disk, flash memory, Application Specific Integrated Circuit (ASIC), Field Programmable Gate Array (FPGA), and the like (shown by way of example as medium 850 in FIG. 8). Multiple computer-readable media may be used. The medium (or media) may be encoded with instructions which, when executed on one or more processors, perform methods that implement the various processes described herein. Such medium (or media) may be considered an article of manufacture or a machine, and may be transportable from one machine to another.

Those skilled in the art will therefore understand that various changes in form and detail may be made to the embodiments disclosed herein without departing from the scope of the invention.

What is claimed is:

1. A method of managing a predetermined configuration of physical components of an electronic system for providing information technology (IT) resources to users, comprising:
    communicating over a network with the predetermined configuration of physical components of the electronic system to discover configuration information from the predetermined configuration of physical components, the predetermined configuration of physical components including a plurality of storage components, a plurality of compute components, and a plurality of network components; and
    generating a system object instance according to an object model of the electronic system and using the configuration information discovered from the predetermined configuration of physical components of the electronic system, the object model being a definition of a class and the system object instance being an instance of the class, the system object instance representing the electronic system as a unified entity and including (i) a first set of sub-object instances and (ii) a second set of sub-object instances that are instances of sub-classes subordinate to the class, the first set of sub-object instances of the system object instance representing respective logical categories of the physical components, and the second set of sub-object instances of the system object instance representing respective physical components of the electronic system and providing access to the configuration information discovered from the predetermined configuration of physical components over the network,
    wherein the first set of sub-object instances includes a logical storage instance to represent the plurality of storage components of the predetermined configuration of physical components of the electronic system as a unified entity, a logical compute instance to represent the plurality of compute components of the predetermined configuration of physical components of the electronic system as a unified entity, and a logical network instance to represent the plurality of network components of the predetermined configuration of physical components of the electronic system as a unified entity.

2. The method of claim 1,
    wherein the second set of sub-object instances includes physical storage instances to represent respective plurality of physical storage components of the electronic system, and
    wherein the physical storage instances are subordinate to the logical storage instance in the system object instance.

3. The method of claim 2,
    wherein the physical storage instances each include a set of attribute properties that are the same across different vendor models of physical storage components, and
    wherein generating the system object instance includes populating specific attribute values for the set of attribute properties of the physical storage instances, the specific attribute values populated for each of the physical storage instances being specific to a vendor model of a physical storage component represented by a respective physical storage instance.

4. The method of claim 3, wherein the logical storage instance includes at least one sub-instance of the logical storage instance to represent respective logical storage components of the electronic system.

5. The method of claim 4, wherein the respective logical storage components include at least one of a LUN (logical unit number), a VSAN (virtual storage area network) or a RAID (redundant array of independent disks) group.

6. The method of claim 3,
    wherein the second set of sub-object instances further includes physical compute instances to represent respective plurality of physical compute components of the electronic system, and
    wherein the physical compute instances are subordinate to the logical compute instance in the system object instance.

7. The method of claim 6,
    wherein the physical compute instances each include a set of attribute properties that are the same across different vendor models of physical compute components, and
    wherein generating the system object instance includes populating specific attribute values for the set of attribute properties of the physical compute instances, the specific attribute values populated for each of the physical compute instances being specific to a vendor model of a physical compute component represented by a respective physical compute instance.

8. The method of claim 7, wherein the logical compute instance includes at least one sub-instance of the logical compute instance to represent respective logical compute components of the electronic system.

9. The method of claim 8, wherein the respective logical compute components include at least one of a logical compute system and a logical compute blade.

10. The method of claim 7,
wherein the second set of sub-object instances further includes physical network instances to represent respective plurality of physical network components of the electronic system, and
wherein the physical network instances are subordinate to the logical network instance in the system object instance.

11. The method of claim 10,
wherein the physical network instances each include a set of attribute properties that are the same across different vendor models of physical network components, and
wherein generating the system object instance includes populating specific attribute values for the set of attribute properties of the physical network instances, the specific attribute values populated for each of the physical network instances being specific to a vendor model of a physical network component represented by a respective physical network instance.

12. The method of claim 11, wherein the logical network instance includes at least one sub-instance of the logical network instance to represent respective logical network components of the electronic system.

13. The method of claim 12, wherein the respective logical network components include at least one of a VNIC (virtual network interface card) and a VLAN (virtual local area network).

14. The method of claim 11,
wherein the predetermined configuration of physical components of the electronic system further include connectivity components for making physical connections between other components,
wherein the first set of sub-object instances further includes a logical connectivity instance to represent the connection components of the electronic system as a unified entity,
wherein the second set of sub-object instances further includes physical connectivity instances to represent respective physical connectivity components of the electronic system, and
wherein the physical connectivity instances are subordinate to the logical connectivity instance in the system object instance.

15. The method of claim 1, wherein at least one of the second set of sub-object instances includes a parent attribute property, and wherein generating the system object instance includes populating each parent attribute property with a value identifying a respective parent object instance.

16. The method of claim 1, wherein at least one of the second set of sub-object instances includes a health attribute property, and wherein generating the system object instance includes populating each health attribute property with a value indicating a health status of a respective physical component.

17. The method of claim 16, wherein multiple instances of the second set of sub-object instances include health attribute properties, the health attribute properties having values indicating health statuses of respective physical components, and wherein the method further comprises:
computing an overall health metric for the predetermined configuration of physical components of the electronic system as a whole based on the values indicating the health statuses; and
providing the overall health metric as an attribute of the system object instance.

18. The method of claim 1,
wherein communicating over the network with the predetermined configuration of physical components to discover the configuration information from the predetermined configuration of physical components includes discovering physical relationships among the predetermined configuration of physical components, and
wherein generating the system object instance includes rendering the discovered physical relationships among the predetermined configuration of physical components in the system object instance.

19. The method of claim 18,
wherein communicating over the network with the predetermined configuration of physical components to discover configuration information from the predetermined configuration of physical components further includes discovering logical relationships among the predetermined configuration of physical components, and
wherein generating the system object instance includes rendering the discovered logical relationships among the predetermined configuration of physical components in the system object instance.

20. The method of claim 1, wherein the system object instance further includes a set of attributes reflecting overall configuration of the predetermined configuration of physical components of the electronic system.

21. A computerized apparatus, comprising:
a set of processors; and
memory, coupled to the set of processors, the memory storing executable instructions, which when executed by the set of processors cause the set of processors to perform a method of managing a predetermined configuration of physical components of an electronic system for providing information technology (IT) resources to users, the method comprising:
communicating over a network with the predetermined configuration of physical components of the electronic system to discover configuration information from the predetermined configuration of physical components, the predetermined configuration of physical components including a plurality of storage components, a plurality of compute components, and a plurality of network components;
generating a system object instance according to an object model of the electronic system and using the configuration information discovered from the predetermined configuration of physical components of the electronic system, the object model being a definition of a class and the system object instance being an instance of the class, the system object instance representing the electronic system as a unified entity and including (i) a first set of sub-object instances and (ii) a second set of sub-object instances that are instances of sub-classes subordinate to the class, the first set of sub-object instances of the system object instance representing respective logical categories of the physical components, the second set of sub-object instances of the system object instance representing respective physical components of the electronic system and providing access to the configuration information discovered from the predetermined configuration of physical components over the network, wherein the first set of sub-object instances includes a logical storage instance to represent the plurality of storage components of the predetermined configuration of physical components of the electronic system as a unified entity, a logical compute instance to represent the plurality of compute components of the predetermined configuration of physical components of the electronic system as a unified entity, and a logical network instance to represent the plurality of network components of the predetermined configuration of physical components of the electronic system as a unified entity.

22. A non-transitory computer readable medium including instructions which, when executed by a set of processors of a computerized apparatus, cause the set of processors to perform a method of managing a predetermined configuration of physical components of an electronic system for providing information technology (IT) resources to users, the method comprising:

communicating over a network with the predetermined configuration of physical components of the electronic system to discover configuration information from the predetermined configuration of physical components, the predetermined configuration of physical components including a plurality of storage components, a plurality of compute components, and a plurality of network components;

generating a system object instance according to an object model of the electronic system and using the configuration information discovered from the predetermined configuration of physical components of the electronic system, the object model being a definition of a class and the system object instance being an instance of the class, the system object instance representing the electronic system as a unified entity and including (i) a first set of sub-object instances and (ii) a second set of sub-object instances that are instances of sub-classes subordinate to the class, the first set of sub-object instances of the system object instance representing respective logical categories of the physical components, the second set of sub-object instances of the system object instance representing respective physical components of the electronic system and providing access to the configuration information discovered from the predetermined configuration of physical components over the network, wherein the first set of sub-object instances includes a logical storage instance to represent the plurality of data storage components of the predetermined configuration of physical components of the electronic system as a unified entity, a logical compute instance to represent the plurality of compute components of the predetermined configuration of physical components of the electronic system as a unified entity, and a logical network instance to represent the plurality of network components of the predetermined configuration of physical components of the electronic system as a unified entity.

* * * * *